(12) United States Patent
Baek et al.

(10) Patent No.: US 7,614,594 B2
(45) Date of Patent: Nov. 10, 2009

(54) STANDING APPARATUS

(75) Inventors: Jin Uk Baek, Daegu-si (KR); Sung Yul An, Woolsan-si (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 11/482,822

(22) Filed: Jul. 10, 2006

(65) Prior Publication Data
US 2007/0040077 A1    Feb. 22, 2007

(30) Foreign Application Priority Data
Aug. 16, 2005   (KR) .................. 10-2005-0074887

(51) Int. Cl.
*E04G 3/00* (2006.01)
(52) U.S. Cl. ............ 248/274.1; 248/276.1; 248/280.11; 248/284.1; 248/292.14; 16/302; 361/679.02
(58) Field of Classification Search ............... 248/133, 248/274.1, 276.1, 280.11, 284.1, 283.1, 292.14, 248/121, 122.1, 123.11, 138, 140, 142, 149, 248/291.1, 292.11, 292.13, 917, 919, 920, 248/921, 922, 923, 371, 372.1, 176.3, 220.21, 248/220.22, 222.11, 222.13, 222.52; 16/302, 16/366, 287; 361/679.02, 681
See application file for complete search history.

(56) References Cited

U.S. PATENT DOCUMENTS

| | | | | |
|---|---|---|---|---|
| 6,822,857 B2 * | 11/2004 | Jung et al. | ............. | 361/679.02 |
| 6,905,099 B2 * | 6/2005 | Sung | ........................... | 248/146 |
| 7,198,237 B2 * | 4/2007 | Cho et al. | .................... | 248/133 |
| 7,404,233 B2 * | 7/2008 | Lu et al. | ........................ | 16/302 |
| 7,424,994 B2 * | 9/2008 | Jeong | ...................... | 248/278.1 |
| 2004/0211866 A1* | 10/2004 | Jung et al. | .................. | 248/133 |
| 2005/0017135 A1* | 1/2005 | Jung et al. | .................. | 248/133 |

* cited by examiner

*Primary Examiner*—J. Allen Shriver
*Assistant Examiner*—Todd M. Epps
(74) *Attorney, Agent, or Firm*—Birch, Stewart, Kolasch & Birch, LLP (57) ABSTRACT

A standing apparatus is provided. The standing apparatus includes a base, a link, and a stopping device. The base is placed on a seat surface to support a display device. The link has one side connected with the display device and the other side rotatably connected to the base. The stopping device maintains a folded state of the link when the link is folded with respect to the base. The stopping device includes a stopper and a stopper fixing groove. The stopper is supported by one of the base and the link, and the stopper fixing groove is formed in the other of the base and the link to allow the link to maintain a folded state by automatically interfering with the stopper when the link reaches the folded state.

18 Claims, 7 Drawing Sheets

STANDING APPARATUS

BACKGROUND OF THE INVENTION

1. Field of the Invention

The present invention relates to a standing apparatus, and more particularly, to a standing apparatus in which a link is fixed while the standing apparatus is folded, and the fixed link is reliably supported against external impact or repeated use.

2. Description of the Related Art

Generally, a standing apparatus includes a base seated on a predetermined horizontal plane, a display main machine for displaying an image, and a link part for connecting the base with the display main machine. Here, the lower end of the link part is rotatably supported by a pair of fixing brackets coupled to the base. The upper end of the link part is connected to the display main machine to allow the display main machine to be tilted.

Recently, an auxiliary link is installed on the lateral side of the link part to prevent rotation of the link part. Generally, the auxiliary link includes two parallel links.

A spring is installed between the two links. The spring provides elastic force to a main link to assist the link part standing up when the link part is released from its folded state.

The standing apparatus includes a fixing device for fixing a folded state of the main link when the main link is folded. The fixing device is installed on one side of the base closely located to a display hinge part of the link part when the link part of the standing apparatus is folded. When the standing apparatus is folded, the fixing device couples to a coupling part formed on the display hinge part of the link part, thereby fixing movement of the link part. To release the fixing device, a user should release the fixing device coupled to the coupling part of the link part by pulling a release lever located at the lower portion of the standing apparatus.

However, a related art fixing device is formed at the base of the standing apparatus separately, which increases the thickness of the base and complicates the structure of the base.

Also, since the related art fixing device is formed on a position of the base that is opposite to a base hinge part of the main link, the shape of the base is limited when the fixing device is installed on the position.

Also, a user should raise the standing apparatus and manipulate a release device lever located on the backside of the standing apparatus in order to release a folded state of the standing apparatus, which causes inconvenience to a user.

SUMMARY OF THE INVENTION

Accordingly, the present invention is directed to a standing apparatus that substantially obviates one or more problems due to limitations and disadvantages of the related art.

An object of the present invention is to provide a standing apparatus including a main link automatically fixed when folded.

Another object of the present invention is to provide a standing apparatus in which the shape of a base of the standing apparatus is not limited by the location of a fixing device.

A further another object of the present invention is to provide a standing apparatus in which a main link is not automatically released by impulse generated when used or repeated use once the main link is folded.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a standing apparatus including: a base placed on a seat surface, for supporting a display device; a link having one side connected with the display device and the other side rotatably connected to the base; and a stopping device for maintaining a folded state of the link when the link is folded with respect to the base, wherein the stopping device includes: a stopper supported by one of the base and the link; and a stopper fixing groove formed on the other of the base and the link, for allowing the link to maintain the folded state by automatically interfering with the stopper when the link reaches the folded state.

In another aspect of the present invention, there is provided a standing apparatus including: a base placed on a seat surface, for supporting a display device; a main link having one side connected with the display device and the other side rotatably connected to the base; a hinge provided between the main link and a connection portion of the base, for allowing the main link to maintain one of a folded state and a standing state with respect to the base; and a stopping device automatically stopped to allow the main link to maintain the folded state when the main link changes from the standing state to the folded state, and allows the main link to be released from the folded state by a user's manipulation when the main link changes from the folded state to the sanding state.

In a further another aspect of the present invention, there is provided a standing apparatus including: a display part; a base placed on a seat surface, for supporting the display part; a main link for connecting the display part with the base; an auxiliary link formed on one side of the main link; a stopper for moving together with the main link; a first elastic member for providing force that moves the stopper in a direction different from a movement direction of the main link; a stopper fixing part on which the stopper is hooked, and for stopping movement of the main link when the stopper is moved by the force from the first elastic member; a second elastic member connected to the base, for providing force that moves the main link; and a third elastic member connected to the auxiliary link, for providing the main link.

According to the above-described construction, the stopper is located on one side of the main link of the standing apparatus and thus the standing apparatus does not require a separate fixing device at the other side of the base, so that the base is not limited by the fixing device.

Also, the main link is automatically fixed when folded, which provides convenience to a user.

Also, since the main link of the standing apparatus is not automatically released by external impulse or repeated use once folded, a user may safely use the standing apparatus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
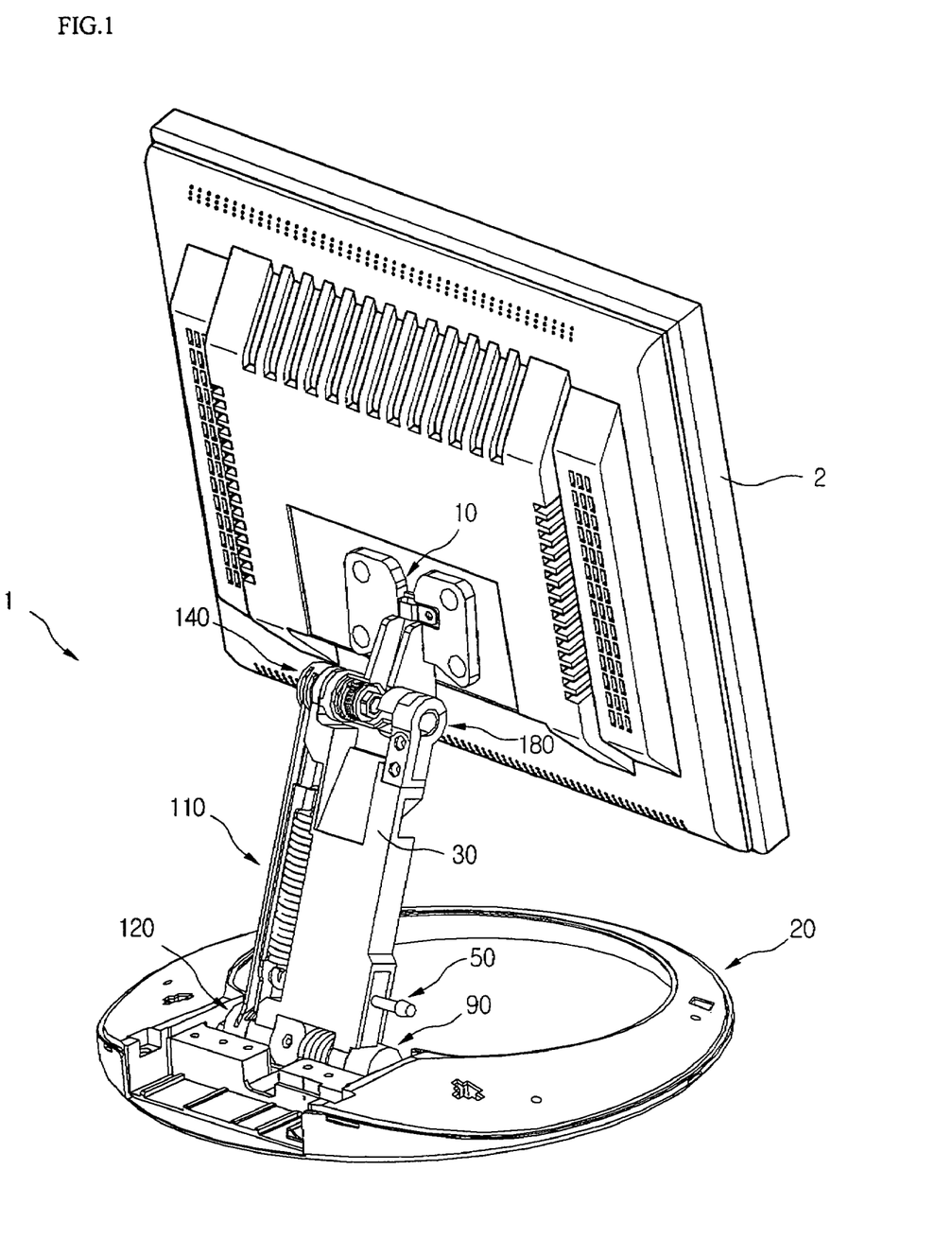
FIG. 1 is a perspective view of a standing apparatus according to the present invention.

FIG. 1 is a perspective view of a standing apparatus according to the present invention.

Referring to FIG. 1, the standing apparatus includes: a support 10 fixed on the backside of an image display device such as a liquid crystal display (LCD) monitor, for supporting the image display device; and a base 20 for seating the image display device on the bottom; and a main link 30 whose both ends are rotatably connected with the support 10 and the base 20, respectively.

An auxiliary link part 110 connected between the support 10 and the base 20 is located on one lateral side of the main link 30. A folding stopper unit 50 installed in the base 20 in order to fix folding of the main link 30 is located on the other lateral side of the main link 30.

In detail, the support 10 is rotatably connected with the main link 30 through a first link hinge 180 and a second link hinge 140.

Also, the main link 30 is rotatably connected with the base 20 through a first base hinge 90 and a second base hinge 120.

Both ends of the auxiliary link part 110 are installed first auxiliary link hinges, respectively, located in the second link hinge 140 and the second base hinge 120. A spring is located inside the auxiliary link part 110. One end of the spring is connected with the main link 30, and the other end of the spring is connected with one side of the lateral surface of the auxiliary link.

The folding stopper unit 50 is installed in a lower lateral side of the main link to maintain a folded state of the main link 30 when the main link 30 is folded. Detailed construction and operation of the folding stopper unit 50 will be described later.

Figure 2:
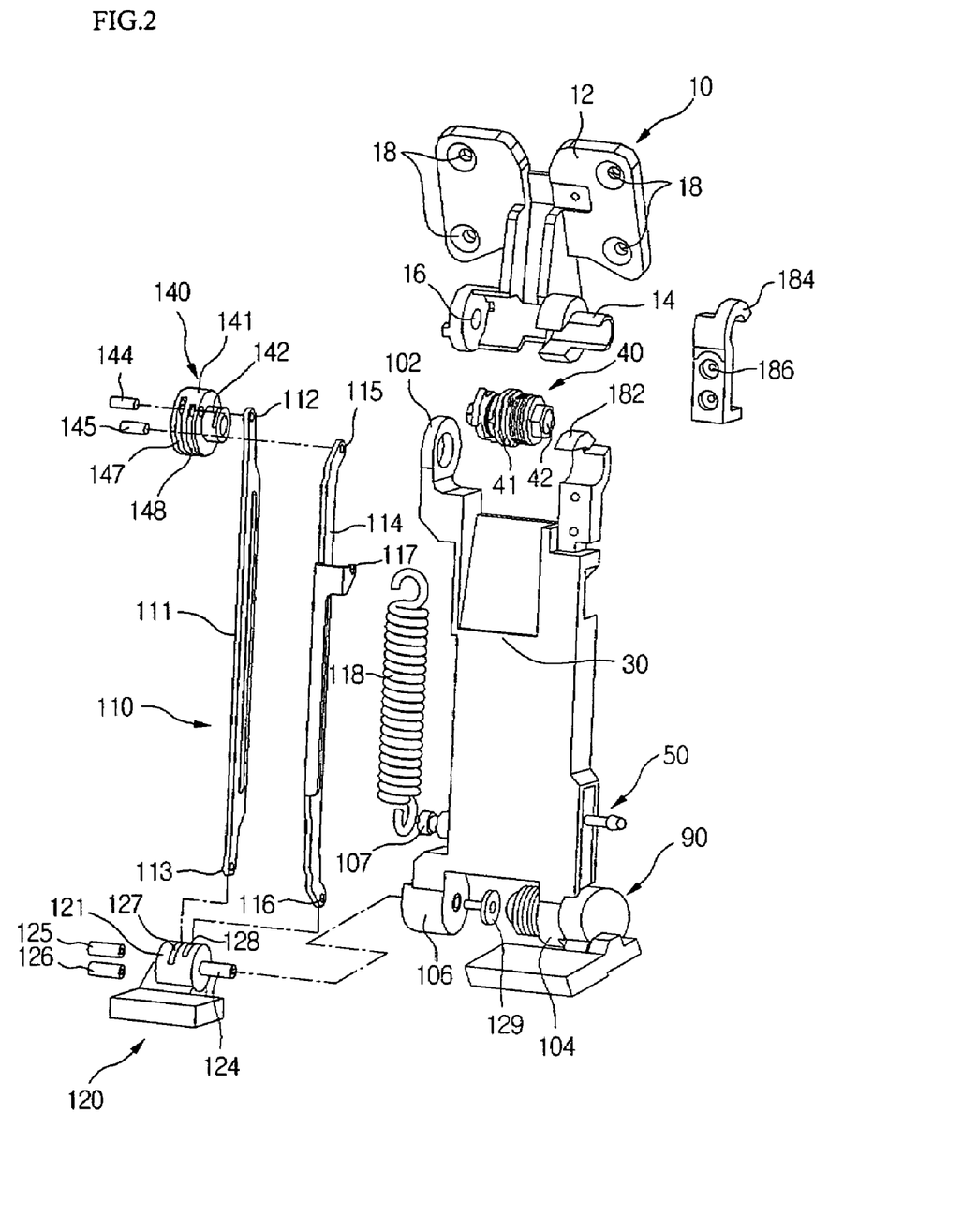
FIG. 2 is an exploded perspective view of a standing apparatus according to the present invention.

FIG. 2 is an exploded perspective view of a standing apparatus according to the present invention.

Referring to FIG. 2, the support 10 includes a display support stand 12 fixed on the backside of the display device 2. A plurality of display coupling holes 18 are formed in the display support stand 12. Coupling members such as a screw are coupled to the display coupling holes 18, so that the display support stand 12 is coupled to the display device 2.

A first hinge shaft 14 is formed on one side in the lower portion of the support stand 12, and a second hinge hole 16 is formed in the other side in the lower portion of the support stand 12.

The first hinge shaft 14 is seated on the first hinge receiving part 182 of the main link 30. A first hinge coupling member 184 is coupled to the first hinge receiving part 182. Consequently, the position of the display support stand 12 is rotatably fixed with respect to the main link 30. First hinge coupling holes 186 for receiving coupling members such as a screw are formed in the first hinge coupling member 184 to couple to the first hinge receiving part 182.

A second hinge spring member 40 is installed inside the second hinge hole 16, and includes a second hinge spring 41 allowing the support 10 to be tilted and a second hinge shaft 42 constituting a hinge shaft of the second link hinge 140.

One end of the second hinge shaft 42 passes through a second hinge shaft receiving part 102 formed in the upper end of the main link 30 and couples to a second link support shaft 142 extending from the inner side of a second auxiliary link support 141.

The second auxiliary link support 141 includes second auxiliary link receiving parts 147 and 148 for receiving ends of two auxiliary links 111 and 114 installed on the lateral side of the main link 30. The two auxiliary links 111 and 114 may be parallel to each other.

A rotational axis line of the two auxiliary links 111 and 114 is spaced a predetermined distance from a rotational axis line of the main link 30.

One end of the two auxiliary links 111 and 114 is rotatably fixed in the second auxiliary link support 141 through second auxiliary link fixing shafts 144 and 145. Through holes 113 and 116 are formed in the other end of the two auxiliary links 111 and 114. The through holes 113 and 116 are received in auxiliary link receiving parts 127 and 128 formed in the first auxiliary link support 121.

The ends of the two auxiliary links 111 and 114 are rotatably fixed in the first auxiliary link receiving parts 127 and 128 through first auxiliary link fixing shafts 125 and 126.

A second base hinge 120 is located inside the first auxiliary link receiving parts 127 and 128 to hinge-fix the main link 30 to the base 20.

The second base hinge 120 includes a first base hinge shaft receiving part 124 extending to the inside of the first auxiliary link receiving parts 127 and 128. The first base hinge shaft receiving part 124 is inserted into a second base hinge receiving part 106 formed in the lower end of the main link 30.

A second base hinge shaft 129 is located inside the second base hinge receiving part 106, which is fitted into the inside of the base hinge receiving part 106 through a hole formed in one side of the second base hinge receiving part 106, and couples to the second base hinge shaft receiving part 124.

A main spring 118 is installed inside the first auxiliary link 114 of the two auxiliary links 111 and 114 that is adjacent to the main link 30. One end of the main spring 118 is fixed at a second main spring support protuberance 117 formed on the upper inside of the first auxiliary link 114, and the other end of the main spring 118 is fixed at a support protuberance 107 formed on the lower lateral side of the main link 30.

The first base hinge 90 is formed on the other side of the second base hinge 120 of the main link 30. A folding stopper unit 50 is located on one side of the first base hinge 90. Part of the folding stopper unit 50 is inserted into the main link 30, and the lower portion of the folding stopper unit 50 is formed on the upper portion of the first base hinge 90.

The folding stopper unit 50 automatically fixes the position of the main link 30 when the standing apparatus of the present invention is folded. A portion of the folding stopper unit 50 is automatically coupled, at a predetermined location, to a fixing part formed on the base when the main link 30 is folded, so that the main link 30 is fixed at the folding position.

Release of the folding stopper unit 50 is manually performed when a user presses a release lever formed on one side of the folding stopper unit 50.

As described above, since the folding stopper unit 50 according to the present invention automatically fixes the main link 30, the release of the main link 30 is manually performed, the folding stopper unit 50 operates semi-automatically. That is, the folding stopper unit 50, which is one element of a standing apparatus according to the present invention, may be called a semi-automatic folding stopper.

Structure and operation of the folding stopper unit 50 will be described in detail.

Figure 3:
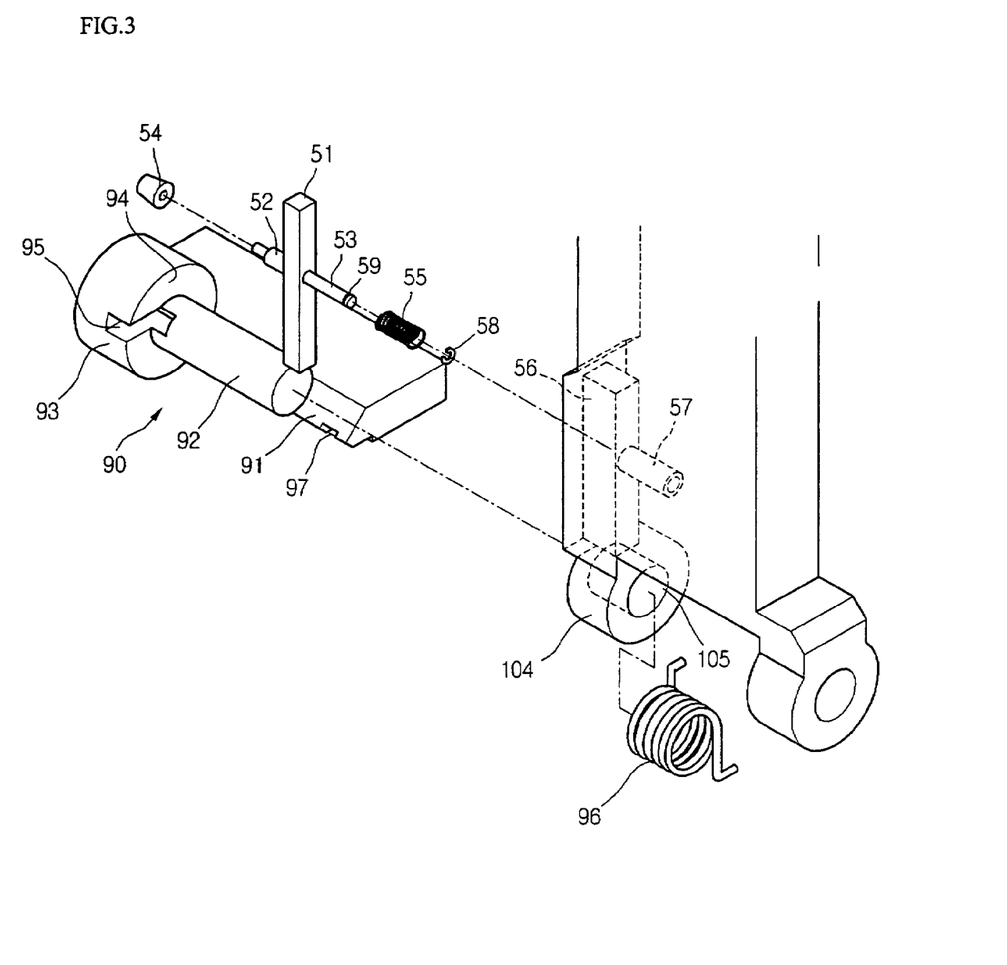
FIG. 3 is an exploded perspective view of a semi-automatic folding stopper of a standing apparatus according to the present invention.
Figure 4:
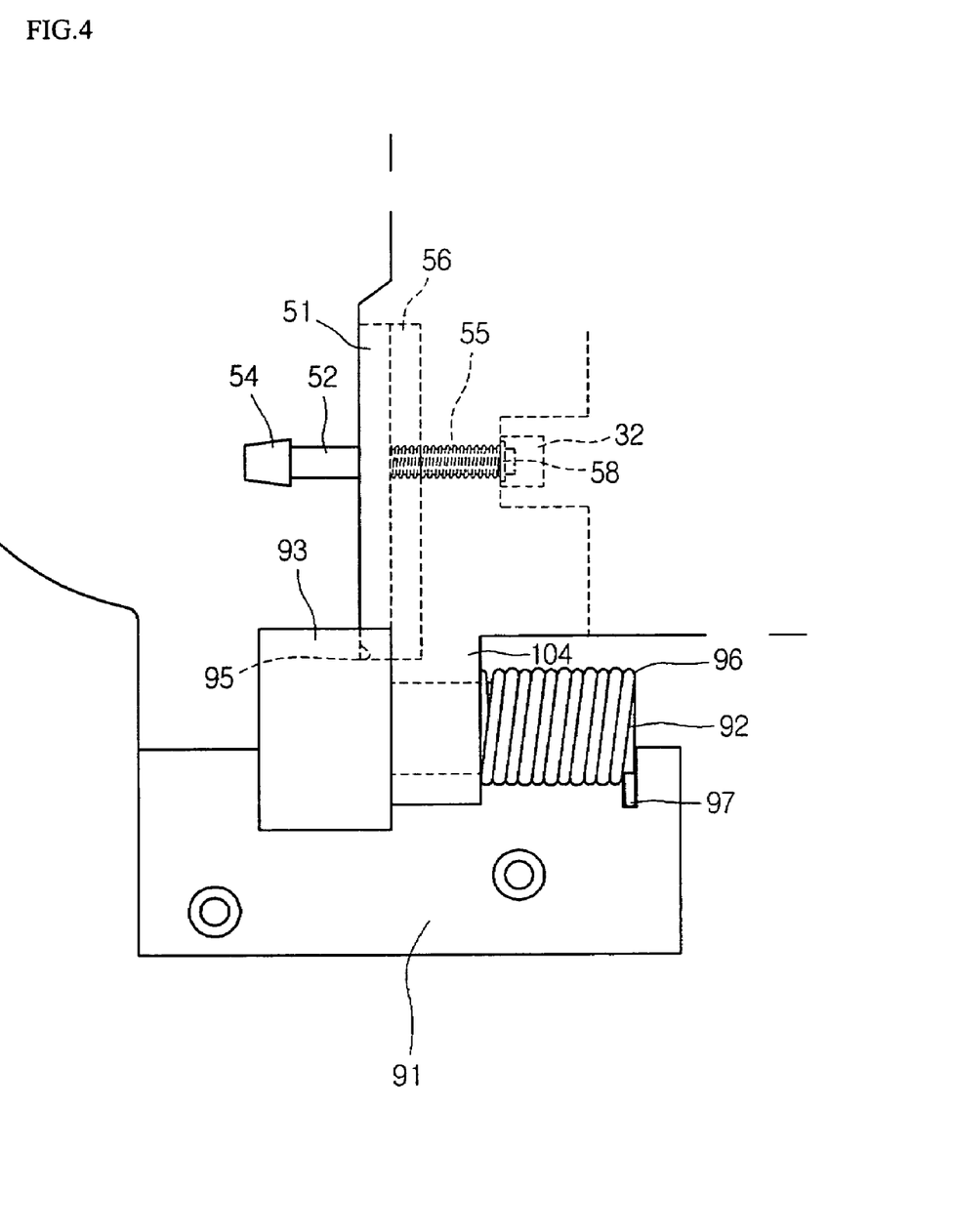
FIG. 4 is a backside view of a folding stopper when a standing apparatus of the present invention is folded.

FIG. 3 is an exploded perspective view of a semi-automatic folding stopper of a standing apparatus according to the present invention, and FIG. 4 is a backside view of a folding stopper when a standing apparatus of the present invention is folded.

Referring to FIG. 3, the folding stopper unit 50 includes a stopper 51 and a stopper fixing part 93.

In more detail, the folding stopper unit 50 is formed in the first base hinge 90, which includes a base fixing part 91 fixed on the base 20. The folding stopper unit 50 including the stopper fixing part 93 and the stopper 51 is located on the upper outer side of the base fixing part 91. A twist spring fixing groove 97 is formed inside the base fixing part 91 to fix one end of a twist spring 96 installed on the first base hinge shaft 92

The stopper fixing part 93 of the folding stopper unit 50 is formed on the upper side of the base fixing part 91. The stopper fixing part 93 has a cylindrical shape axially extending to the outside with respect to the first base hinge 92. A stopper fixing groove 95 is formed inside the stopper fixing part 93. The stopper fixing groove 95 is recessed to the inside from the outer periphery of the stopper fixing part 93, and consists of a rectangular groove having a predetermined width.

One plane of the planes constituting the stopper fixing groove 95 is open in an inner direction of the stopper fixing part 93, and another plane of the planes constituting the stopper fixing groove 95 is open in a radical direction of the stopper fixing part 93. At this point, the upper surface and the lower surface of the planes of the stopper fixing groove 95 may be parallel to the bottom.

A guide surface 94 is formed on the inner side of the stopper fixing part 93 to allow the stopper 51 to contact when the stopper 51 rotates. The guide surface 94 is formed in the radial direction of the first base hinge shaft 92 on the inner plane of the stopper fixing part 93. The base hinge shaft 92 is located at the center of the guide surface 94, i.e., the center of the inner surface of the stopper fixing part 93 to extend inside the main link 30.

The stopper 51 is located in the upper side of the first base hinge shaft 92. The stopper 51 may consist of a long bar shape. A release lever shaft 52 protrudes on one side of the stopper 51 that faces the outer side of the main link 30. A release lever 54 is fitted at the end of the release lever shaft 52.

The outer lower side of the stopper 51 contacts the guide surface 94 of the stopper fixing part 93. A spring receiving shaft 53 for receiving a spring 55 protrudes in an inner direction on the inner surface of the stopper 51. The spring 55 is fitted on the spring receiving shaft 53.

A washer receiving part 59 having a diameter smaller than that of the spring receiving part 53 is formed on the end of the spring receiving part 53. A spring washer 58 is fitted and fixed on the washer receiving part 59.

The spring washer 58 is received in a stopper movement limit part 32 formed inside the main link 30. The spring washer 58 is received in the stopper movement limit part 32, which prevents the stopper 51 from getting out of the inside of the main link 30.

A twist spring 96 is fitted and fixed on the first base hinge shaft 92. The twist spring 96 is twisted in a direction opposite to a rotational direction of the main link 30 when the main link 30 rotates, and accordingly, provides elastic force in a direction that stands up the main link 30 when the main link 30 is released from a folded state.

One end of the twist spring 96 is fixed at the lower end of the main link 30 inside the first base hinge receiving part 104, and the other end of the twist spring 96 is fixed at the twist spring fixing groove 97 formed inside the base fixing part 91.

A stopper receiving part 56 where the stopper 51 is located is formed on the upper side of the first base hinge receiving part 104 of the main link 30. The stopper receiving part 56 consists of a groove formed in the lateral side of the main link and having a depth at least two times greater than the width of the stopper 51. The stopper 51 is installed in the stopper receiving part 56 so that it may be movable horizontally.

The outer lower end of the stopper receiving part 56 is open to an outer peripheral direction in the inside of the stopper fixing part 93. When the main link 30 is fully folded, the outer lower end of the stopper receiving part 56 overlaps with the stopper fixing groove 95, so that the stopper 51 does not detached to the outer side of the main link 30 even though the lower end of the stopper 51 is fitted in the stopper fixing groove 95 of the stopper fixing part 93 when the main link 30 is folded.

Referring to FIGS. 3 and 4, a spring receiving part 57 for receiving the spring 55 located inside the stopper 51 is formed inside the stopper receiving part 56 of the main link 30. The spring receiving part 57 consists of a cylindrical hole in order to receive the spring 55 and to sustain the inserted end of the spring 55. Therefore, the spring 55 push the stopper 51 toward the guide surface 94.

The stopper movement limit part 32 is formed inside the spring receiving part 57 to limit a movement of the stopper 51. The stopper movement limit part 32 includes an inner space for receiving the spring washer 58, and one side of which consists of a surface for limiting movement of the spring washer 58. The stopper 51 is so formed as to allow the spring washer 58 of the stopper 51 to be located inside the limit side.

With the above construction, the stopper 51 is movably installed in the stopper receiving part formed within one side of the main link 30.

In more detail, referring to FIG. 4, the stopper 51 is received in the stopper receiving part 56 of the main link 30, and movable horizontally when seen from FIG. 4. At this point, the spring washer 58 fixed at one end of the stopper 51 is movable only within the stopper movement limit part 32 and is not detached to the outside of the limit side, so that the stopper 51 is not detached to the outside of the limit side.

The spring 55 interposed between the spring washer 58 and the stopper 51 provides elastic force always pushing the stopper 51 to the outer direction of the main link 30. One end of the spring 55 is supported by the limit side of the stopper movement limit part 32, and thus provides the stopper 51 with force perpendicular to a rotational direction of the stopper 51 with respect to the main link 30.

Consequently, when the main link 30 is folded, or when a user presses the release lever 54 in order to release a folded state, the stopper 51 is moved horizontally within the main link 51. Operation of the stopper 51 will be described in more detail with reference to the accompanying drawings.

Figure 5:
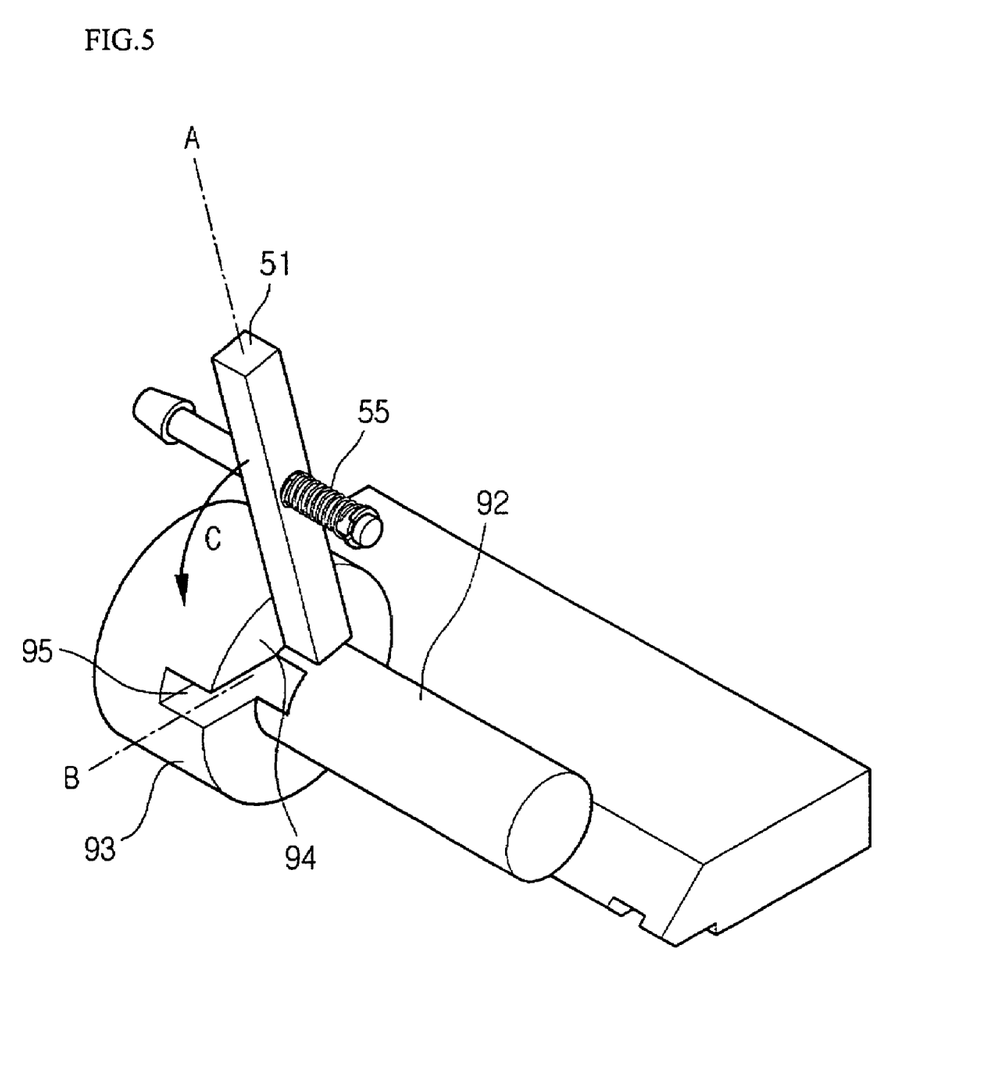
FIG. 5 is a partial perspective view of a folding stopper in a standing apparatus according to the present invention.
Figure 6:
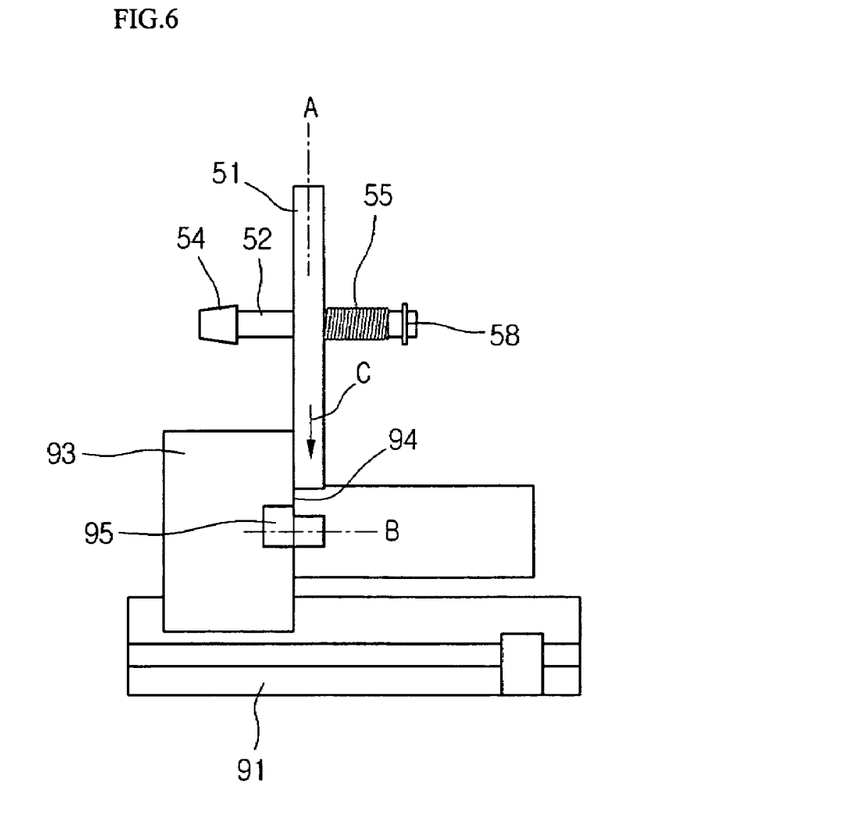
FIG. 6 is a front view of FIG. 5.

FIG. 5 is a schematic perspective view explaining an operation of a stopper, and FIG. 6 is a front view of FIG. 5.

Figure 7:
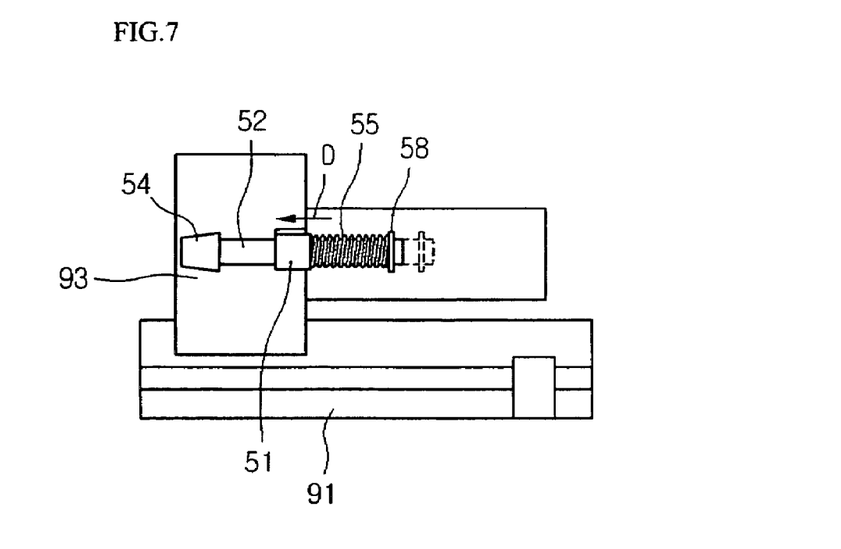
FIGS. 7 and 8 are views explaining movement operations of a stopper when the stopper is placed on a position B parallel to the bottom.
Figure 8:
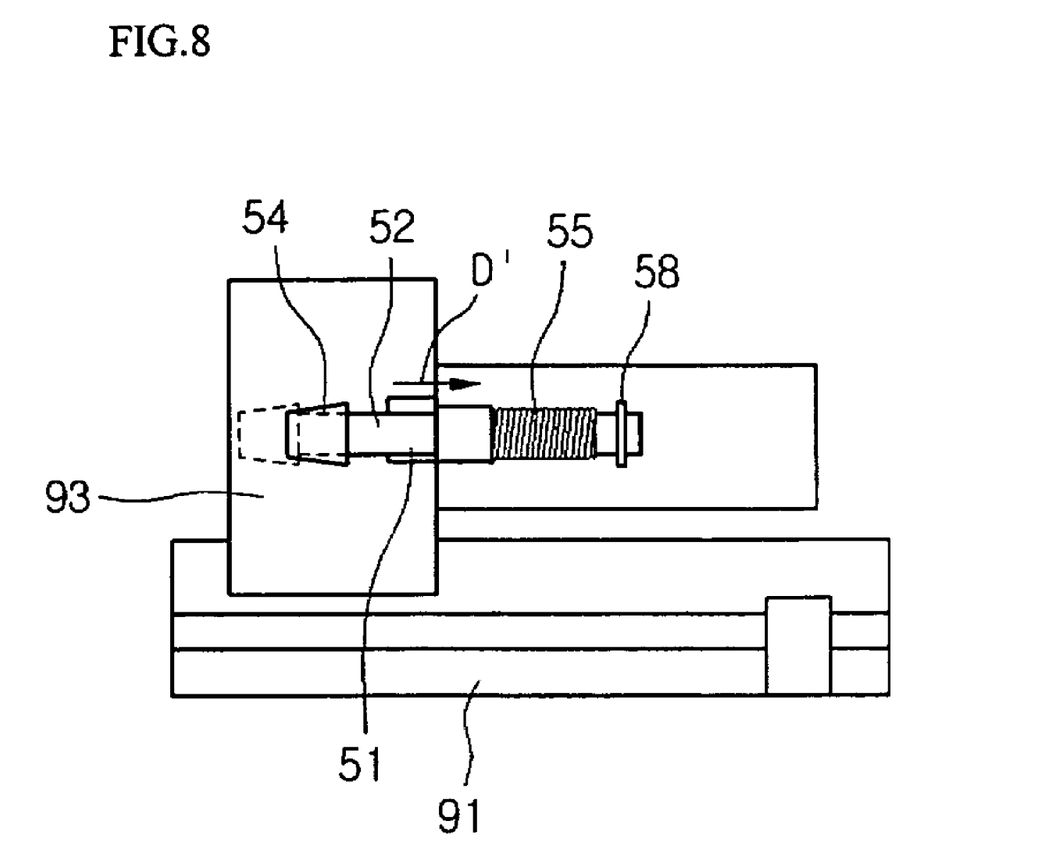

FIGS. 7 and 8 are views explaining movement operations of the stopper 51 when the stopper 51 is placed on a position B parallel to the bottom. FIG. 7 is a view illustrating the stopper 51 is fitted in the stopper fixing groove 95 when the main link 30 is in a folded state, and FIG. 8 is a view illustrating the stopper 51 is detached from the stopper fixing groove 95 when the main link 30 is in a folded state.

Operation of the stopper 51 will be described with reference to FIGS. 5 through 8.

Referring to FIGS. 5 through 8, when the main link 30 stands up, the stopper 51 is raised with respect to the base hinge shaft 92 at the same angle as an angle of the main link 30 with respect to the base hinge shaft 92. In FIG. 5, a raised location of the main link 30 is denoted by a symbol A.

At this point, the spring 55 provided on one side of the stopper 51 presses the stopper 51 to the outside of the main link 30, i.e., in a direction of the stopper fixing part 93. Therefore, the outer lower surface of the stopper 51 contacts the guide surface 94.

At this point, when the main link 30 rotates in a rotational direction C, the stopper 51 is rotated in the rotational direction C along the guide surface 94 on the inner side of the stopper fixing part 93. The main link 30 is fully folded at the position B where the main link 30 is parallel to the bottom.

When the main link is fully folded, the stopper 51 is moved to the position B parallel to the bottom. The stopper fixing groove 95 is formed in the position B, and one side of the stopper fixing groove 95 is open in a direction of the guide surface 94. Therefore, when the stopper 51 reaches a position in which the stopper fixing groove 95 is formed, i.e., the position B, the stopper 51 is moved in a direction of the stopper fixing groove 95 by pushing force of the spring 55 because the guide surface 94 supporting the stopper 51 against the outside is absent at the position B. Such a movement of the stopper 51 is illustrated in FIG. 7.

Referring to FIG. 7, when the stopper 51 is moved up to the position B in which the stopper fixing groove 95 is formed, the stopper 51 is moved in an outer direction D of the main link 30 by the force of the spring 55 and fitted into the stopper fixing groove 95.

When the stopper 51 is fitted into the stopper fixing groove 95, rotation of the main link 30 stops and folding of the main link 30 is fixed. Therefore, when a user rotates the main link 30 up to the position B in which the stopper fixing groove 95 is formed in order to fold the main link 30, the lower portion of the stopper 51 is automatically seated into the stopper fixing groove 95 to allow the main link 30 is to be folded.

On the other hand, to release the automatically fixed stopper 51, a user should forcibly move the stopper 51 seated into the stopper fixing groove 95 to the outside of the stopper fixing groove 95, i.e., to a position where the outer side of the stopper 51 contacts the guide surface 94.

Referring to FIG. 8, a user should push inward the release lever formed on the outer end of the stopper 51 in order to release the stopper 51 seated into the stopper fixing groove 95. When a user pushes the release lever inward, the stopper 51 is moved in an inner direction D' of the main link 30, and accordingly, the stopper 51 is detached from the stopper fixing groove 95.

When the stopper 51 is detached from the stopper fixing groove 95 completely, the stopper 51 is released. When the stopper 51 is released, the main link 30 is rotated to its standing position by elastic force from the twist spring 96 installed in the first base hinge 29 and the main spring 118 formed in the auxiliary link 114.

At this point, as far as a user does not push the release lever, the stopper 51 remains fixed in the stopper fixing groove 95.

Since the stopper 51 seated into the stopper fixing groove 95 is pressed toward the outer direction by the spring 55, the standing apparatus is not released by itself by shaking or external impulse once the main link 30 is folded and fixed.

To raise the folded main link 30 again, a user should push inward the release lever protruding on the lateral side of the main link 30. Since such a release operation is much simpler than a release operation applied to a case where a fixing device is installed to the lower side of a standing apparatus in a related art, the present invention provides convenience to a user.

Various modifications may be made within the scope of the present invention.

For example, the locations of the stopper 51 and the stopper fixing part 93 may be exchanged. That is, the stopper 51 and the stopper fixing part 93 may be installed on the base 20 and the main link 30, respectively. Alternatively, the stopper 51 and the stopper fixing part 93 may be installed in the auxiliary link 114 and the base 20, respectively.

In addition, even though the washer 58, washer receiving portion and stopper movement limit part 32 do not provided in other embodiment, this invention can be operated, only if the spring 55 located at the side of the main link 30 pushes the stopper 51 toward the stopper groove 95 located at the side of the base.

According to the standing apparatus having the above-described construction, the main link is automatically folded when the standing apparatus is folded, which provides convenience.

Also, according to the standing apparatus of the present invention, once the main link is fixed, the fixing state is not released by itself unless a user releases the fixing state, so that a user may safely use the standing apparatus.

Also, to release the fixing state of the folded main link, a user only pushes the release lever of the stopper that is installed on the later side of the main link, which provides convenience compared to the case where a release lever is installed in the lower side of the standing apparatus.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A standing apparatus comprising:
   a base placed on a seat surface, and configured to support a display device;
   a link having one side connected with the display device and the other side rotatably connected to the base; and
   a stopping device configured to maintain a folded state of the link when the link is folded with respect to the base,
   wherein the stopping device includes:
   a stopper movably supported by one of the base and the link;
   an elastic member configured to push the stopper in a predetermine direction; and
   a stopper fixing groove formed on the other of the base and the link, and configured to allow the link to maintain the folded state by automatically interfering with the stopper when the link reaches the folded state, and
   wherein the elastic member pushes the stopper toward the stopper fixing groove.

2. The standing apparatus according to claim 1, wherein the stopper is formed on the link, and the stopper fixing groove is formed in the base.

3. The standing apparatus according to claim 1, wherein the stopper fixing groove is provided in a stopper fixing part, and the stopper fixing part constitutes part of a hinge serving as a rotational shaft of the link and the base.

4. The standing apparatus according to claim 3, wherein the stopper is guided to the lateral side of the stopper fixing part and rotated.

5. The standing apparatus according to claim 3, wherein the stopper fixing part does not rotate even when the link rotates.

6. The standing apparatus according to claim 1, wherein a rotational plane of the link and a movement trace of the stopper cross each other.

7. The standing apparatus according to claim 1, wherein a release lever is formed on the outer surface of the stopper to allow a user to push the release lever.

8. The standing apparatus according to claim 7, wherein the releasing lever extends in a predetermined direction crossing the stopper.

9. The standing apparatus according to claim 1, further comprising:
a stopper receiving shaft formed on the inner side of the stopper, and configured to support an elastic member; and
a stopper receiving part formed in the link, and configured to guide the stopper receiving shaft.

10. A standing apparatus comprising:
a base placed on a seat surface, and configured to support a display device;
a main link having one side connected with the display device and the other side rotatably connected to the base;
a hinge provided between the main link and a connection portion of the base, and configured to allow the main link to maintain one of a folded state and a standing state with respect to the base; and
a stopping device automatically stopped to allow the main link to maintain the folded state when the main link moves from the standing state to the folded state, and allows the main link to be released from the folded state by a user's pushing movement when the main link moves from the folded state to the standing state,
wherein the stopping device comprises:
a stopper movably supported by one of the base and the link;
an elastic member configured to push the stopper in a predetermine direction; and
a stopper fixing groove formed on the other of the base and the link, and aligned with the stopper, and configured to hinder a rotational motion of the hinge by interfering with the stopper when the stopper moves.

11. The standing apparatus according to claim 10, further comprising a spring formed on the hinge, for providing force that restores the main link to the standing state when the main link moves from the folded state to the standing state.

12. The standing apparatus according to claim 10, wherein an auxiliary link is formed on one side of the main link to adjust an angle of the display device when the main link rotates.

13. The standing apparatus according to claim 10, wherein
the stopper is configured to rotate together with the main link; and
the stopper fixing part is fixed on the base.

14. The standing apparatus according to claim 10, wherein the stopping device is operated by hindering movement of the hinge.

15. The standing apparatus according to claim 10, wherein
the stopper is configured to automatically move when the main link reaches the folded state; and
the stopper fixing groove is configured to receive at least part of the stopper when the stopper moves.

16. The standing apparatus according to claim 15, wherein the stopper rotates together with the main link and the stopper fixing groove is formed on the base.

17. The standing apparatus according to claim 15, wherein the elastic member pushes the stopper toward the stopper fixing groove.

18. A standing apparatus comprising:
a display part;
a base placed on a seat surface, and configured to support the display part;
a main link configured to connect the display part with the base;
an auxiliary link formed on one side of the main link;
a stopper configured to move together with the main link;
a first elastic member configured to provide force that moves the stopper in a direction different from a movement direction of the main link;
a stopper fixing part configured to catch the stopper and stopping movement of the main link when the stopper is moved by the force from the first elastic member;
a second elastic member connected to the base, and configured to provide force that moves the main link; and
a third elastic member connected to the auxiliary link, and configured to provide the main link.

* * * * *